United States Patent
Haynes et al.

(10) Patent No.: US 7,337,370 B2
(45) Date of Patent: Feb. 26, 2008

(54) SYSTEM AND METHOD FOR CAPTURING SIGNIFICANT EVENTS AT WEB PORTLETS

(75) Inventors: Dennis F. Haynes, Anniston, AL (US); John M. Higdon, Lexington, KY (US); Tina M. Lemire, Lexington, KY (US); Martin L. Miller, III, Georgetown, KY (US); Ronak A. Naik, Lexington, KY (US); William P. Shaouy, Atlanta, GA (US); Mary Louise Snedden, San Carlos, CA (US)

(73) Assignee: International Business Machines Corporation, Armonk, NY (US)

( * ) Notice: Subject to any disclaimer, the term of this patent is extended or adjusted under 35 U.S.C. 154(b) by 630 days.

(21) Appl. No.: 10/856,661

(22) Filed: May 28, 2004

(65) Prior Publication Data
US 2005/0278562 A1 Dec. 15, 2005

(51) Int. Cl.
*G06F 11/00* (2006.01)
(52) U.S. Cl. .......................................... 714/47; 707/102
(58) Field of Classification Search .................. 714/47, 714/20, 57; 715/742, 705; 706/50, 60; 707/102
See application file for complete search history.

(56) References Cited

U.S. PATENT DOCUMENTS

| | | | | |
|---|---|---|---|---|
| 5,884,312 A | * | 3/1999 | Dustan et al. ................ | 707/10 |
| 6,434,745 B1 | | 8/2002 | Conley, Jr. et al. ......... | 717/177 |
| 6,445,774 B1 | * | 9/2002 | Kidder et al. ............... | 379/9.03 |
| 6,553,378 B1 | * | 4/2003 | Eschelbeck .................. | 707/10 |
| 6,629,106 B1 | * | 9/2003 | Narayanaswamy et al. ....................... | 707/104.1 |
| 6,633,835 B1 | | 10/2003 | Moran et al. ................ | 702/190 |
| 6,662,176 B2 | | 12/2003 | Brunet et al. ................ | 707/2 |
| 6,728,769 B1 | * | 4/2004 | Hoffmann .................... | 709/225 |
| 6,735,602 B2 | * | 5/2004 | Childress et al. ........... | 707/200 |
| 6,898,597 B1 | * | 5/2005 | Cook et al. .................. | 707/10 |
| 7,117,193 B1 | * | 10/2006 | Basko et al. ................. | 707/1 |
| 2002/0169868 A1 | | 11/2002 | Lopke et al. ................ | 709/224 |
| 2003/0053420 A1 | * | 3/2003 | Duckett et al. .............. | 370/252 |
| 2003/0084377 A1 | | 5/2003 | Parks et al. .................. | 714/38 |
| 2004/0162810 A1 | * | 8/2004 | Jeon ............................. | 707/1 |
| 2004/0237077 A1 | * | 11/2004 | Cole et al. ................... | 717/162 |
| 2004/0243577 A1 | * | 12/2004 | Choudhary et al. ............ | 707/6 |
| 2005/0144269 A1 | * | 6/2005 | Banatwala et al. ......... | 709/223 |
| 2005/0188315 A1 | * | 8/2005 | Campbell et al. ........... | 715/742 |

OTHER PUBLICATIONS

Bernal, Anthony. Modeling WebSphere Portal Portlets with UML: Part 3—Portlet Services. IBM. Jan. 29, 2003 [retrieved on Apr. 16, 2007]. Retrieved from the Internet <URL: http://www-128.ibm.com/developerworks/websphere/library/techarticles/0301_bernal/bernal.html>. p. 1.*

* cited by examiner

*Primary Examiner*—Scott Baderman
*Assistant Examiner*—Paul F Contino
(74) *Attorney, Agent, or Firm*—Shelley M Beckstrand; John R. Pivnichny

(57) ABSTRACT

System and method for logging significant events occurring at a web site portal includes a base class portlet service including a significant event catcher method having a register method and a record method, a portlet action table, and an action description table. The register method is called during portlet initialization to register one or more significant event descriptions to the action description table. The portlet, upon executing a significant event, calls the record method to record the event to the portlet action table.

7 Claims, 4 Drawing Sheets

| SESSION_ID (121) | PORTLET_ID (125) | ACTION_ID (123) | TIME_STAMP (122) |
|---|---|---|---|
| 2002102415:22:2400691-5 0CZZ0T3UGW2XKL WXB15THQ | CONTRACT ADMINISTRATION PORTLET 104 | 1 | 2003-07-02 15:21:30. 511183 |
| 2002102211:35:1200039- VM0ZSWISIOWBO LX41NWWOBI | FEEDBACK PORTLET 105 | 1 | 2003-07-02 15:21:45. 323781 |
| ... | ... | ... | ... |

PORTLET ACTION TABLE
FIG. 2

| PORTLET_ID (125) | ACTION_ID (123) | ACTION_DESC (126) |
|---|---|---|
| CONTRACT ADMINISTRATION PORTLET 104 | 1 | ENTITLEMENT RECORD ADDED |
| CONTRACT ADMINISTRATION PORTLET 104 | 2 | ENTITLEMENT RECORD DELETED |
| CONTRACT ADMINISTRATION PORTLET 104 | 3 | ENTITLEMENT RECORD ADDED |
| FEEDBACK PORTLET 105 | 1 | FEEDBACK SUBMITTED |
| ... | ... | ... |

PORTLET DESCRIPTION TABLE
FIG. 3

SYSTEM AND METHOD FOR CAPTURING SIGNIFICANT EVENTS AT WEB PORTLETS

BACKGROUND OF THE INVENTION

1. Technical Field of the Invention

This invention relates to call management on the web. More particularly, it relates to capturing significant events at web servers.

2. Background Art

The ultimate goal of any web site built for call management is to reduce cost per call incident. This may be accomplished by diverting traditional voice calls to a self help web site or by reducing the amount of time per call.

Creating a service allows the code to reside in one location which allows for a more flexible plug and play web site architecture. It also allows the code to be updated in one place (rather than changing every web page which needs to write a significant event.)

Information of certain users actions on a web site may be characterized as significant events. A significant event usually includes a unique session identifier, a time stamp, an action, and a user identifier.

A significant event is usually written to the database as an integer, which integer is small, light weight, and can be easily reported on, together with a time stamp. A secondary database table is usually built which matches the significant event integer to a string description. At the time of reporting, the two tables are cross referenced in order to produce a human readable report. This works well; however, it requires someone to manually update the string table before the significant events. This makes the update of the table a problem when the web site is constantly being changed and updated, especially in a portlet world.

It is an object of the invention to provide an improved system and method for capturing significant events at a web site.

SUMMARY OF THE INVENTION

A system, method, and program storage device are provided for recording events on a web site by registering in a base class portlet service a listing of event types from a portlet, each having an associated short description; storing the listing and short description in a first database table; thereafter logging events in a second database table by session ID, portlet ID, short description, and time stamp; and generating a human readable report from the first and second database tables.

In accordance with an aspect of the invention, there is provided a computer program product configured to be operable to provide a base class service for registering and recording significant events occurring at a portlet.

Other features and advantages of this invention will become apparent from the following detailed description of the presently preferred embodiment of the invention, taken in conjunction with the accompanying drawings.

BRIEF DESCRIPTION OF THE DRAWINGS

FIG. 2 illustrates the portlet action table of FIG. 1.

FIG. 3 illustrates the action description table of FIG. 1.

DETAILED DESCRIPTION OF PREFERRED EMBODIMENTS

With the use of the web, reducing the cost per call involves harvesting the information of users' actions on the web site as significant events. The present invention provides a system, method, and program storage device for capturing and harvesting information of users' actions on a web site 100. Such user's actions are significant events 120.

A portal is a Web site that provides end users with a single point of access to Web-based resources by aggregating those resources in one place and by requiring that users log in only to the portal itself, and not to each portlet they use. A portlet is a special, reusable servlet, such as a JAVA servlet, that appears as a defined region on a portal page. It is typical for a portal page to contain many portlets.

Figure 1:
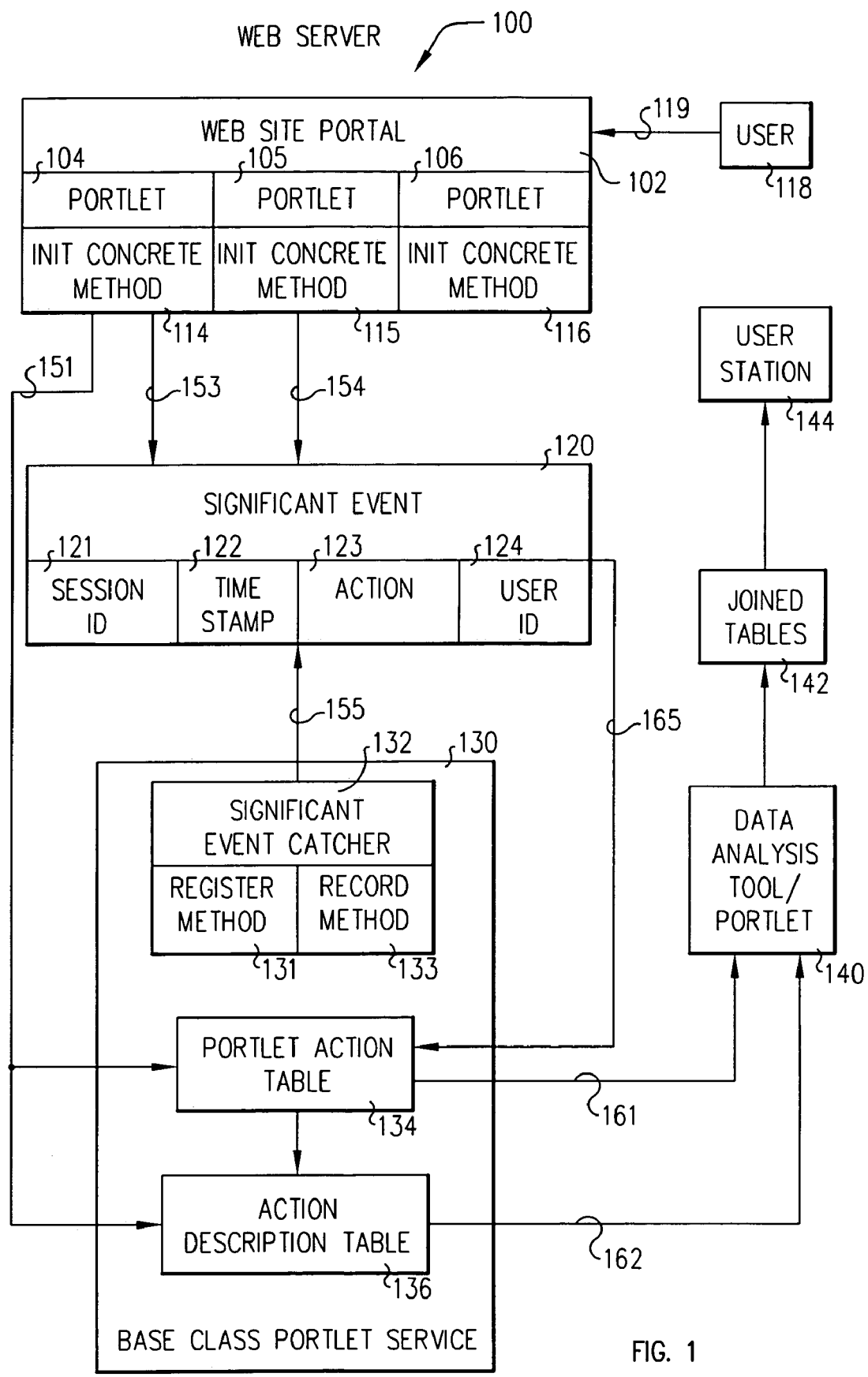
FIG. 1 is a high level system diagram illustrating the base class portlet service of the preferred embodiment of the invention.

Referring to FIG. 1, base class, such as a Java class, provides generic functions, or methods, to all portlets that wish to use them. The base class is part of a portlet service 130, which is a block of executable code accessible to all portlets 104-106. A significant catcher function 132 is one of the functions, or methods, that the base class offers to any portlet, and it includes a register method 131 and a record method 133. Its role is to capture and log significant events 120 performed by participating portlets.

A significant event catcher 132 is a web service which can be installed independently of portlets 104-106. A portlet 104 may use dynamic discovery to decide if a requested web service 130 is available, and if it is not available to allow or enable a web administrator to quickly decide not to report any events.

A significant event 120 includes a unique session identifier 121, a time stamp 122, an action 123, and a user identifier 124.

It is desirable to provide for writing light weight objects 165 into a database 134 when writing significant events 120. A base class portlet service 130 is provided, accessible to any portlet 104-106, which provides significant catching functions that perform this task, available for use by multiple portlets, such as portlets 104, 105. As is represented by line 155, significant event catcher function 132 gathers events from all of the participating portlets 104-105 in the portal 102 and writes them to a selected group of significant event database tables 134, 136. The information may then be retrieved by technicians, administrators, or business people at user station 144 with proper access to the tables 134, 136.

As is represented by line 165, lightweight objects are inserted into database 134. A significant event 120 is written to database 134 as an integer (which is small, light weight, and can be easily reported on) with a time stamp 122. A secondary database table, the action description table 136, matches the significant event integer to a string description. As is represented by lines 161, 162, at the time of reporting, the two tables 134, 136 are cross referenced by data analysis tool (which may be a portlet) to produce a human readable report for display at user station 144.

As is represented by lines 153, 154, participating portlets 104, 105 auto-register significant events 134 and corresponding descriptions 136. In a portlet's initConcrete method 114, 115, respectively, significant events are registered which could be logged during the life cycle of the portlet. The initConcrete method 114 for a particular portlet 104 is only called once when the web server 100 loads the portlet 104. This is not a per user operation, but is done at the web server 100 level. This allows significant event catcher 132 to be dynamic based upon what is installed on the system.

In accordance with an exemplary embodiment, the two database tables 134, 136 are COMMON.SESSION_ACTIONS, the portlet action table 134, and COMMON.ACTION_VALUE the action description table 136. These tables have the following fields:
 COMMON.ACTION_VALUES
 PORTLET_ID 125
 ACTION_ID 123
 ACTION_DESC 126
 COMMON.SESSION_ACTIONS
 SESSION_ID 121
 PORTLET_ID 125
 ACTION_ID 123
 TIME_STAMP 122

Referring to FIG. 3, action description table 136 provides a complete description for each action 123 defined in each portlet 104, 105. Each action is identified by a short, convenient integer value 123. These integer values must be unique within a portlet 104. However, they need not be unique across portlets 104, 105.

Referring to FIG. 2, portlet action table 134 provides a log of every action performed by every portlet 104, 105 which has registered actions 123 (line 151 shows such for portlet 104). Each row in table 134 provides an action logging portlet's session ID 121, portlet ID 125, action ID 123, and time stamp 122 of the action.

The two tables 134, 136 can be joined as table 142 for business users at station 144 to monitor what actions were performed by particular portlets 104, 105, and when they were performed. The business user at user station 144 can query and view this information through a high level data analysis tool 140, such as a custom application (even a portlet) that displays the joined data 142.

The initConcrete method gets executed once during the initialization of a concrete instance of a portlet. A concrete instance of a portlet is a running instance of a portlet that behaves according to a set of configuration parameters. A portlet can have multiple concrete instances that behave differently depending upon its configuration parameters.

The initConcrete method performs the following steps in registering a significant event. Again, the registering of a significant event occurs only once in a portlet's lifecycle.

STEP 1: The portlet looks at its portal-administrator-defined settings and reads the value of a flag called RECORD_SIGNIFICANT_EVENTS. The flag's value can be "true" or "false"

STEP 2: If the flag is true, the portlet calls registerEvent (in the base class service 130) for every kind of significant event the development team wishes to capture. Pseudocode for registerEvent is set forth in Table 1.

Figure 4:
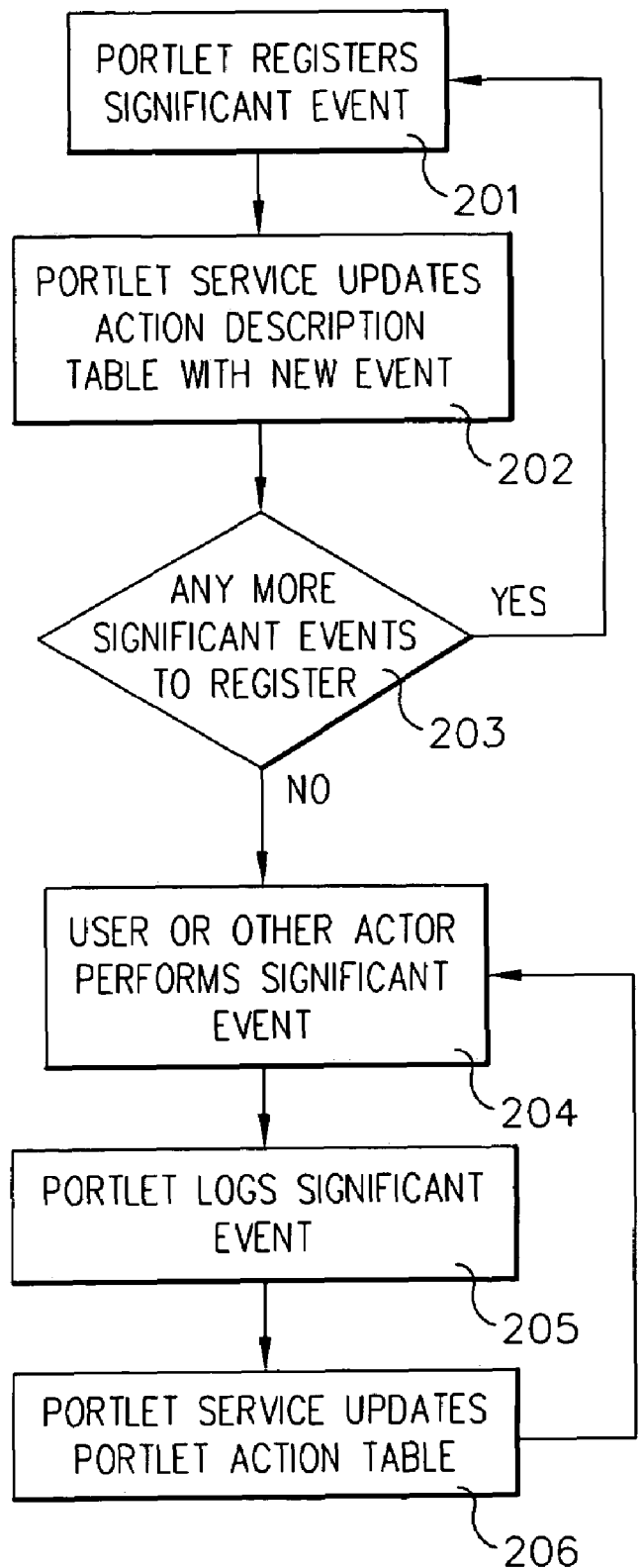
FIG. 4 illustrates the method of an exemplary embodiment of the invention for capturing significant events at web portlets.

Referring to FIG. 4, a portlet 104 in this architecture undergoes a typical flow to participate in the registration and logging process, as follows:

In step 201, as is represented by line 151, portlet 104 calls register method 131 to register a significant event to portlet action table 136.

In step 202, portlet service 130 updates action description table 136, in this example with the new event represented by action ID=1 123 of table 136 from contract administration portlet 104.

In step 203, portlet service 130 determines if there are more significant events to register, and in this example loops through steps 201 and 202 three more times to register contract administration portlet 104 action ID 2 and action ID 3, and then feedback portlet 105 action ID 1, and so on until no more events are to be registered.

In step 204, web site portal 102 detects a significant event 119 from some user 118, and in step 205 portlet 104 calls record method 133 to log, as is represented by line 153, corresponding significant event 120.

In step 206, significant event catcher function 132 catches event 120 and portlet service 130 updates portlet action table 134 with objects 165 representing that significant event 120. In the example of 2 B, an action ID=1 123 is logged from contract administration portlet 104 and action ID=1 123 is logged from feedback portlet 105 (as is represented by lines 154, 165.)

The flowchart in FIG. 4 captures the interplay between a portlet and the portlet service that contains the base class (which in turn contains the significant event catching methods 132, including the register method 131 and record method 133).

Tables 1 and 2 set forth pseudocode for the significant event catching 132 functions, or methods, performed by the base class 130. There are two methods 131, 133, one to register a significant event, and one to record a significant event. The former occurs during step 201. The latter occurs during step 205. The portlet is the caller of both methods.

TABLE 1

REGISTER METHOD

```
public boolean registerEvent (String portletId, int
eventId, String eventDescription) {
    // Initialize the successful flag to false. This will
    // be returned back to the caller.
    boolean successful = false;
    // Put the SQL statement in a string
    String sqlString =
        "insert into "
        + m_dbSchema
        + ".ACTION_VALUES (PORTLET_ID, ACTION_ID,
            ACTION_DESC) VALUES(\'"
        + portletId
        + "\', "
        + eventId
        + ", \'"
        + eventDescription
        + "\')";
    // Create a data store so we can do our database work.
    DataStore ds = new DataStore ( . . . );
    // Try to update the database session action table with
    // the event.
    try {
        ds.executeUpdate (sqlString);
        // Since we made it here, it means that everything
        // worked correctly so we want to inform the
        // caller that the event got written.
        successful = true;
    } catch {
        . . .
    }
    return (successful);
}
```

TABLE 2

RECORD METHOD

```
public boolean recordEvent (String sessionId, String
    portletId, int eventId) {
    // Initialize the successful flag to false. This will
    // be returned back to the caller.
    boolean successful = false;
    // If we do not have a session ID, we have a problem so
    // log an error message and return back to the caller.
    if ((sessionId == null) | | (sessionId.length( ) == 0)) {
        // log error message
        . . .
    }
    // We have a session ID so write to the database.
    else {
        // Put the SQL statement in a string
        String sqlString =
            "insert into "
            + m_dbSchema
            + ".SESSION_ACTIONS (SESSION_ID,
            PORTLET_ID, ACTION_ID,
                TIME_STAMP) VALUES(\'"
            + sessionId
            + "\', \'"
            + portletId
            + "\', "
            + eventId
            + ", CURRENT TIMESTAMP)";
        // Create a data store so we can do our database
        // work.
        DataStore ds = new DataStore ( . . . );
        // Update the database session action table with
        // the event.
        try {
            ds.executeUpdate (sqlString);
            successful = true;
        } catch {
            . . .
        }
    }
    return (successful);
}
```

The two functions of Tables 1 and 2 write to tables 136 and 134, respectively.

Further referring to FIG. 4 in connection with FIG. 1, upon initialization each participating portlet 104-105 in steps 201-203 registers all of its significant events via the base class service 130 available to all participating portlets 104-105. Base class 130 in turn updates action description table 136 with the significant event long descriptions 126 and corresponding short integer descriptions 123.

After initialization and during the normal execution of portlet 104, for example, when user 118 or other actor performs a significant event 119 (120), portlet 104 logs this significant event 120 via its integer value action ID 123, with base class service 130. In turn, base class service 130 updates the portlet action table 134 with the integer value 123, time stamp 122, portlet ID 125, and session ID 121.

By way of example, the code of Table 3 registers (steps 201-203) a few significant events in a portlet.

TABLE 3

SIGNIFICANT EVENTS REGISTRATION

```
Public Method Name: initConcrete
Purpose:
    This method is called to initialize the
    AbstractPortletController. It is responsible for
    creating the resources for the instance of the class.
@param PortletSettings
```

TABLE 3-continued

SIGNIFICANT EVENTS REGISTRATION

```
    Portlet settings from the portlet
@return none
@throws UnavailableException
**************************************************
public void initConcrete(PortletSettings settings)
    throws UnavailableException {
    MSCBaseClassService baseClassService =
        get MSCBaseClassService( );
    // If initConcrete has been configured to record
    // significant events, the significant event actions
    // need to be registered in a cross reference table.
    // This will self register the values, so the table
    // need not be manually maintained.
    if (baseClassService.shouldRecordSignificantEvents
        (settings)) {
        baseClassService.registerSignificantEvent (
            getPortletConfig ( ),
            ADDCCMSUSER_SIGNIFICANT_EVENT,
            "CCMS user successfully added.");
        baseClassService.registerSignificantEvent (
            getPortletConfig ( ),
            ADDECIUSER_SIGNIFICANT_EVENT,
            "ECI user successfully added.");
        baseClassService.registerSignificantEvent (
            getPortletConfig ( ),
            DELETECCMSUSER_SIGNIFICANT_EVENT,
            "CCMS user successfully deleted.");
        baseclassService.registerSignificantEvent (
            getPortletConfig ( ),
            DELETEECIUSER_SIGNIFICANT_EVENT,
            "ECI user successfully deleted.");
        baseClassService.registerSignificantEvent (
            getPortletConfig ( ),
            MODIFYCCMSUSER_SIGNIFICANT_EVENT,
            "CCMS user successfully modified.");
        baseClassService.registerSignificantEvent (
            getPortletConfig ( ),
            MODIFYECIUSER_SIGNIFICANT_EVENT,
            "ECI user successfully modified.");
    }
    // Call super.initConcrete( ) to make sure any
    // markup language specific initConcrete logic
    // will be executed.
    super.initConcrete (settings) ;
}
```

Table 4 sets forth example code for logging a significant event.

TABLE 4

SIGNIFICANT EVENT LOGGING

```
// typically done in an action class
    baseClassService.recordSigniticantEvent (
        request.getPortletSession ( ),
        portletConfig,
        ContractAdminPortlet.
        ADDCCMSUSER_SIGNIFICANT_EVENT);
```

With respect to dynamic discovery, when a portlet records a significant event, it goes through the following steps:

STEP 1: The portlet looks at its portal-administrator-defined settings and reads the value of a flag called RECORD_SIGNIFICANT_EVENTS. The flag's value can be "true" or "false"

STEP 2: If the flag is true, the portlet records its significant event by calling the proper method in the base class service.

The RECORD_SIGNIFICANT_EVENTS flag can be set during development time by the developer, or by the portal administrator in runtime after the portlet has been deployed on a portal. The portlet queries this flag at runtime.

The present invention decouples the significant event gather service 130 from portlets 114-116, allowing for more flexibility as well as better code reuse. The significant event catcher 132 is a service 130 which may be installed or not at server 100. Using the dynamic look up of the web services 130 allows this to behave like a plug and play component, which allows people to have reuse within the web environment 100. The code 130 is located in one place allowing for better updates. This could be enlarged to be a corporate wide repository as long as each significant event 120 remains light weight and the calls to do the actual write 165 remain quick.

No manual update is required inasmuch as auto registering by service 130 of significant events 134 and their descriptions 136 is provided, thus allowing the code applications at portals 104-106 to self register (lines 151, 152) their events 123 and descriptions 126. This is especially important in the portlet world, where systems 100 are dynamic and can be changed easily and quickly.

ADVANTAGES OVER THE PRIOR ART

It is an advantage of the invention that there is provided an improved system and method for capturing significant events at a web site.

ALTERNATIVE EMBODIMENTS

Figure 5:
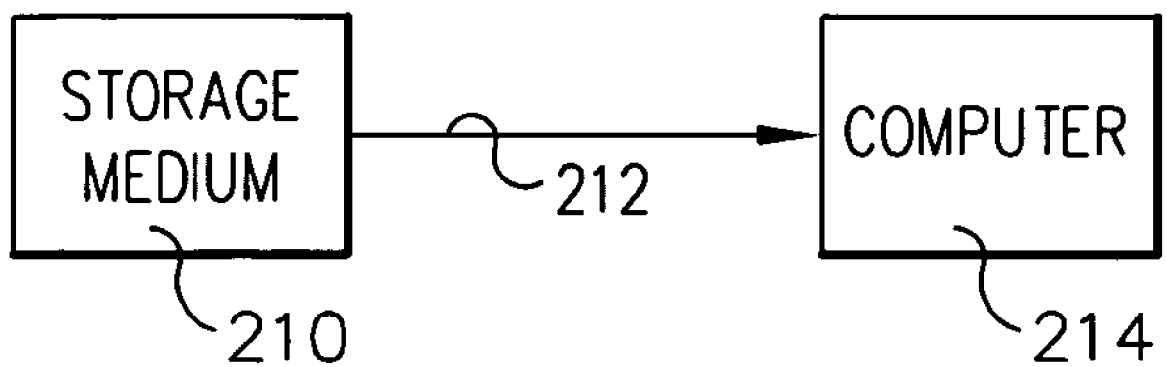
FIG. 5 is a high level system diagram illustrating a program storage device readable by a machine, tangibly embodying a program of instructions executable by a machine to perform method steps for catching significant events at web portlets.

It will be appreciated that, although specific embodiments of the invention have been described herein for purposes of illustration, various modifications may be made without departing from the spirit and scope of the invention. Referring to FIG. 5, in particular, it is within the scope of the invention to provide a computer program product or program element, or a program storage or memory device 210 such as a magnetic or optical, tape or disc, or the like, for storing signals readable by a machine as is illustrated by line 212, for controlling the operation of a computer 214 according to the method of the invention and/or to structure its components in accordance with the system of the invention.

Further, each step of the method may be executed on any general purpose computer, such as IBM Systems designated as zSeries, iSeries, xSeries, and pSeries, or the like and pursuant to one or more, or a part of one or more, program elements, modules or objects generated from any programming language, such as C++, Java, Pl/1, Fortran or the like. And still further, each said step, or a file or object or the like implementing each said step, may be executed by special purpose hardware or a circuit module designed for that purpose.

Accordingly, the scope of protection of this invention is limited only by the following claims and their equivalents.

We claim:

1. A method for logging significant events occurring as user actions at a web site portal, comprising:

providing a base class portlet service including a significant event catcher method having a register method and a record method, a portlet action table, and an action description table for capturing and harvesting information of user actions on a web site;

initializing a portlet, including calling said register method to register one or more significant event descriptions to said action description table;

said register method including building a database statement for an event having a string including portlet ID, action ID, and action description;

executing an attempt using said database statement to update said portlet action table with said event; and if successful signaling success to said portlet;

operating said portlet to execute a significant event, including calling said record method to record said significant event to said portlet action table; and joining said portlet action table and said action description table to provide a joined table for analyzing said significant events.

2. The method of claim 1, including recording said significant event to said portlet action table as a light weight object.

3. The method of claim 1, including during initializing said portlet executing dynamic discovery to determine whether said base class portlet service is available to said portlet.

4. The method of claim 1, said portlet action description table including an action description for each tuple, a tuple being a portlet which is active and a corresponding action identifier.

5. The method of claim 4, said portlet action table including for each recorded significant event a session identifier, portlet identifier, action identifier, and time stamp.

6. The method of claim 1, said register method including:
initializing a success flag to false;
building a database statement for an event having a string including portlet ID, action ID, and action description;
executing an attempt using said database statement to update said portlet action table with said event; and
if successful, setting said success flag to true and returning said success flag to said portlet.

7. The method of claim 6, said record method including:
initializing a success flag to false;
upon determining that a session ID has not been provided to said record method for an event, logging an error message and returning to said portlet; otherwise,
inserting into a database statement a string for said event including session ID, portlet ID, action ID, and time stamp;
updating said portlet action table with said event; and
if successful, setting said success flag to true and returning said success flag to said portlet.

* * * * *